United States Patent [19]
Portmann et al.

[11] Patent Number: 5,159,168
[45] Date of Patent: Oct. 27, 1992

[54] SLIDING CONTACT ROLLER HEAD

[75] Inventors: Niklaus Portmann, Bellikon; Alfonso D'Aniello, Widen; Peter Taiana, Staffelbach; Werner Urech, Kaiserstuhl, all of Switzerland

[73] Assignee: Elpatronic AG, Zug, Switzerland

[21] Appl. No.: 667,021

[22] Filed: Mar. 7, 1991

[30] Foreign Application Priority Data

May 29, 1990 [CH] Switzerland ............ 01818/90

[51] Int. Cl.⁵ .............................................. B23K 11/06
[52] U.S. Cl. .................................. 219/81; 219/84; 439/5
[58] Field of Search .................... 219/81, 82, 83, 84, 219/119, 120; 439/3, 5, 18–23, 29

[56] References Cited

U.S. PATENT DOCUMENTS

| | | | |
|---|---|---|---|
| 1,873,042 | 8/1932 | Rohrdanz | 439/18 |
| 2,205,680 | 6/1940 | Caputo | 219/84 |
| 2,276,925 | 3/1942 | Caputo | 219/84 |
| 2,407,676 | 9/1946 | Munson | 219/84 |
| 2,555,997 | 6/1951 | Portail | 439/5 |
| 2,623,188 | 12/1952 | Tourneau et al. | 310/232 |
| 2,774,898 | 12/1956 | Tourneau | 310/232 |
| 2,908,803 | 10/1959 | Williams et al. | 219/84 |
| 3,400,357 | 9/1968 | Cary et al. | 439/3 |
| 3,546,655 | 12/1970 | Tysver et al. | 439/3 |
| 3,596,225 | 7/1971 | Cary | 439/19 |
| 4,188,523 | 2/1980 | Kawai et al. | 219/83 |
| 4,433,229 | 2/1984 | Morikawa et al. | 219/84 |
| 4,780,589 | 10/1988 | Davies | 219/84 |
| 4,782,207 | 11/1988 | Masuda et al. | 219/84 |

FOREIGN PATENT DOCUMENTS

| | | | |
|---|---|---|---|
| 0182328 | 10/1989 | European Pat. Off. | |
| 636548 | 6/1983 | Switzerland | |
| 610216 | 6/1978 | U.S.S.R. | 439/5 |

Primary Examiner—Geoffrey S. Evans
Attorney, Agent, or Firm—McCormick, Paulding & Huber

[57] ABSTRACT

A roller head (10) for a resistance seam welding machine has an internally located sliding contact current transmission device (24) between stator 12) and rotor (14) and is composed of a pair of circular ring-shaped discs (26, 26') which extend radially between rotor and stator, are fastened to the rotor on their outer circumferences, carry axial sliding contact rings (32,32') on their inner circumferences, and are flexible designed in their intermediate parts (28,28') between inner and outer circumferences. These sliding contact discs (26,26') are composed of a copper mesh, to which the axial sliding contact rings (32,32') are fastened. Thin-walled metallic diaphragms can also be used instead of the copper mesh. The roller head (10) can transmit high welding currents. As a result of the flexible design of the sliding contact discs (26,26') the contact presssure, which is created by a stack of plate springs (40), remains constant even with external mechanical influences.

23 Claims, 5 Drawing Sheets

SLIDING CONTACT ROLLER HEAD

BACKGROUND OF THE INVENTION

The invention relates to a roller head for a resistance seam welding machine, having a stator, an electrode roller which is rotatably mounted on the stator, a sliding contact current transmission device which is arranged between stator and rotor and is pressed by spring force against at least one of them, and ducts in the stator, the rotor and the sliding contact current transmission device for the passage of a coolant.

Such a roller head is known from U.S. Pat. No. 3,546,655 and from U.S. Pat. No. 3,596,225.

Such roller heads with an internally situated sliding contact current transmission device between stator and rotor could in fact be envisaged as a substitute for the fluid roller heads which have been used up to now, but practice has shown that they are not suitable for this purpose in reality.

Fluid roller heads (CH-A-636 548, U.S. Pat. No. 4,188,523) are used for welding inside narrow can bodies. Between the stator and the rotor there is an annular gap in which there is a fluid metal, for example, quicksilver or a gallium alloy, which serves to transmit current from the stator to the rotor. As such roller heads require careful sealing and constant checking of this sealing, and as the fluid metals used are not particularly good heat conductors, and by comparison with copper, are also not good electrical conductors, and as, moreover, with the use of a gallium alloy, problems may arise from the fact that this metal alloy solidifies at temperatures lying not far below room temperature, such fluid roller heads have already been replaced by a roller head with an externally situated sliding contact current transmission device (EP-B1-0 182 328). This known roller head, which has been developed by the Applicant, does remove the aforementioned problems of fluid roller heads, but requires a reconstruction of the welding arm of the resistance seam welding machine if it is to be incorporated instead of the fluid roller head which has otherwise been used in the case of this machine.

The known sliding contact roller heads hereinbefore mentioned, in view of the overall dimensions, can in fact be used instead of fluid roller heads, but they are inferior to the fluid roller heads in respect of the current transmission capacity and length of life, because they have costly brush constructions as a sliding contact current transmission device or as a constituent of the same. The springs which are necessary for pressing the brushes on, also lead to the following further disadvantage.

In the case of the roller head according to U.S. Pat. No. 3,546,655, there are provided on the stator two horizontal pins, on which brush segments are arranged in the form of a ring and are held together here by 0-shaped rings. The rotor carries convex conductor parts between both brush rings. Between the convex conductor parts and the rings of brushes are provided further conductor parts which are constructed planar on their side facing the rings of brushes and concave on the opposite side. Horizontally arranged compression springs press the brush segments against the further conductor parts and also the latter against the convex conductor parts. With eccentricity or out-of-true running of the rotor, the planar surfaces between the brush rings and the further conductor parts can in fact move vertically relative to each other and the further conductor parts can also perform curved movements on the convex surfaces, but many components are involved in these movements, and considering the high electric currents which have to be transmitted in such roller heads between stator and rotor, all current transmission surfaces moving against each other are basically sources of loss which reduce the load-carrying capacity of the roller heads.

Attempts have been made to remove these problems with the sliding contact roller head according to U.S. Pat. No. 3,596,225, merely by providing on the rotor a cylindrical inner surface with which all the brushes which are provided on the stator are in sliding contact. For this purpose, each brush is pressed against the rotor by a radial compression spring, which is arranged centrally underneath the brush. In this brush construction and also in the brush construction of the sliding contact roller head according to U.S. 3,546,655, the contact pressure between the brushes and the contact surfaces of the rotor coordinated with the latter is disadvantageously influenced by vibrations, for example, through external shocks or through running out-of-true. The current-carrying capacity is accordingly reduced. In other respects, the sliding contact according to U.S. Pat. No. 3,596,225 has a plurality of brushes, all of which represent wear parts and therefore make frequent maintenance necessary.

SUMMARY OF THE INVENTION

The object of the invention is to modify a roller head of the type hereinbefore mentioned in such a way that in respect of overall dimensions, current transmission capacity and length of life, it is comparable with fluid roller heads which have been used up to now and which it is intended to replace, and moreover, the sliding contact current transmission device between the stator and rotor has a contact pressure which remains practically uninfluenced by vibrations, eccentricity etc.

This problem, originating from a roller head of the type hereinbefore mentioned, is solved according to the invention in that the sliding contact current transmission device is composed of at least one circular disc, which extends radially between rotor and stator and is flexibly designed in its web or intermediate part which is placed between the inner and outer circumference.

In the roller head according to the invention, the welding current is transmitted from the welding arm of the resistance seam welding machine, through the stator which is clamped in the arm, through at least one flexible sliding contact disc to the electrode roller. As the sliding contact disc is flexible in its intermediate part, that part can yield axially and radially in the event of eccentricity, vibrations etc., so that the sliding contact circumferential area of the disc, over which the current transmission occurs, remains uninfluenced by such external mechanical influences, and for practical purposes the contact pressure is therefore also not disadvantageously influenced. Moreover, the roller head according to the invention manages with a minimal number of components, which considerably reduces the manufacturing costs, maintenance expenditure and wear.

In one development of the invention the construction of the intermediate part is particularly simple and makes a problem-free transmission of very high welding currents possible.

In another development of the invention which provides for the replacement of the copper mesh by a thin-walled metallic diaphragm, it is possible to manufacture the disc as one part with the stator or rotor.

In another development of the invention even with a greater thickness of the disc, the mobility of its intermediate part in axial direction is guaranteed by the design of the intermediate part with spokes.

In another development of the invention an intense cooling of the electrode roller and of the sliding contact surfaces is ensured by the fact that the spokes designed as blades are brought into play for conveying coolant. Here, it is sufficient to design only some of the spokes as blades.

In the development of the invention the disc can in fact be formed on the stator or rotor, for which the aforementioned development of the roller head with a diaphragm as an intermediate part of the disc is suitable, but the diaphragm can also readily be welded or soldered to the stator or rotor.

One development of the invention is preferred, because it distributes the current load of the sliding contact current transmission device to two discs, and so makes smaller cross-sections possible, and because the spring force for the contact pressure can be created with simple measures, for example, by a stack of plate springs arranged between the two discs, or through the design of the discs themselves as flexible diaphragms.

Other developments of the invention make possible the appropriate selection of sliding contact rings used in the sliding contact area. Thus, contact rings of nickel silver can be firmly connected to a flexible copper mesh (for example, by electron beam welding), which are mounted (welded) on the outer circumference, once again in copper contact rings. Instead of nickel silver, a compound of silver/graphite or even silver-plated or gold-plated copper can also be used. If intermediate rings are used for working, copper contact rings or silver-plated or gold-plated copper contact rings can be welded or soldered to the flexible copper mesh, instead of the silver contact rings, and the nickel silver or silver/graphite or silver-plated/gold-plated copper contact rings are clamped to the stator or rotor as inexpensive wear parts.

Still other developments of the invention represent preferred specific embodiments with two sliding contact discs in each case. If the intermediate parts are composed of copper mesh, a stack of plate springs is, as already mentioned, suitably arranged between two discs in order to create the spring force. If the intermediate parts are manufactured as diaphragms composed of a flexible material, and can for this reason be used at the same time as a spring, the mutual spacing of the sliding contact surfaces of the intermediate rings in the inserted position is smaller than the spacing which the sliding contact surfaces of the axial sliding contact rings have in the non-inserted position. Each diaphragm is therefore in a position to create the spring force for the contact pressure itself.

In a further development of the invention according to the cooling of the roller head occurs through a special emulsion containing oil, which not only intensely cools the sliding contact surfaces, but lubricates them in addition. As compared with water that is customary, such a coolant has the advantage that the contacts are not contaminated by lime or other impurities. The emulsion used is stable and above all, suitable for foodstuffs. The flow of coolant through the disc(s) during cooling can be controlled in a simple way by the position and the size of the slits which are provided in the intermediate part in order to form the spokes.

BRIEF DESCRIPTION OF THE DRAWINGS

Exemplified embodiments of the invention are described in greater detail hereafter by reference to the drawings.

DESCRIPTION OF THE PREFERRED EMBODIMENTS

Figure 1:
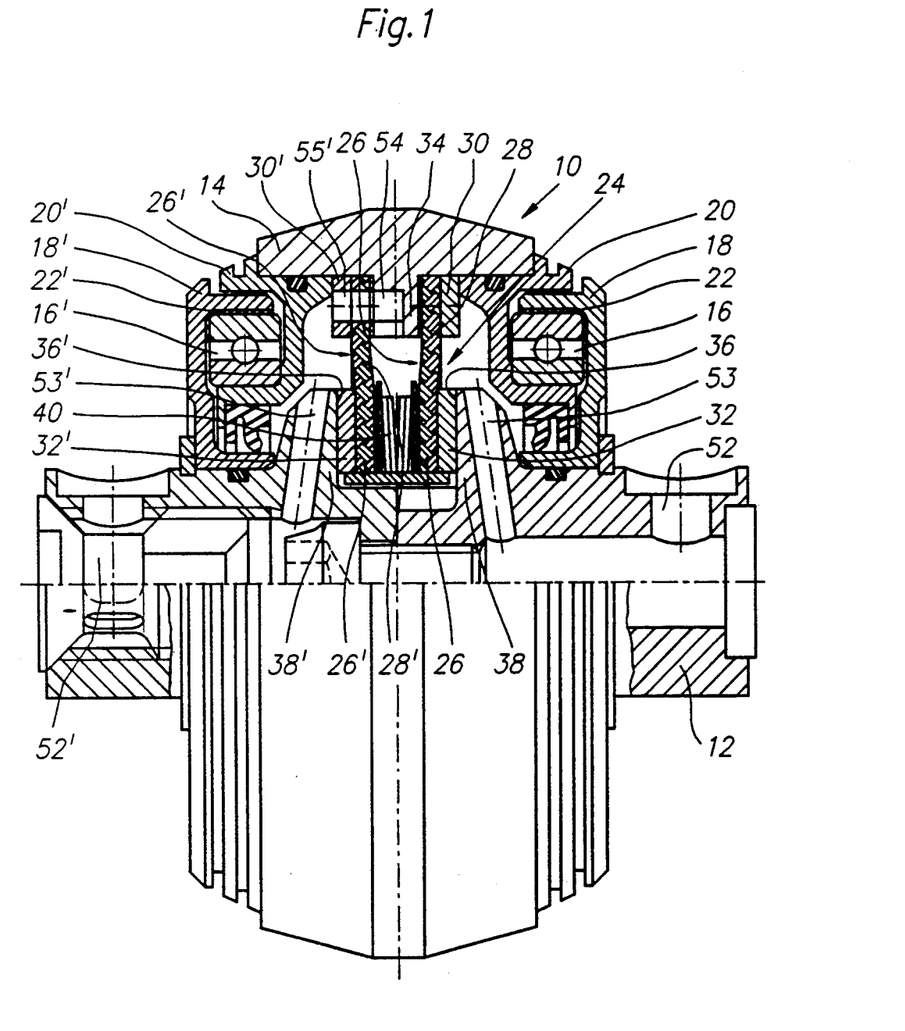
FIG. 1 shows a first specific embodiment of a roller head according to the invention.

FIG. 1 shows a sectional view of a first specific embodiment of a roller head, indicated generally by the reference 10, for an unillustrated resistance seam welding machine for resistance roller seam welding of can bodies. The roller head 10, in the exemplified embodiment illustrated, has a stator 12 designed as a bipartite axle, on which stator a rotor 14 is rotatably mounted by means of ball-bearings 16,16'. (Identical reference numbers provided with a dash each indicate the other part of a pair of identically designed parts). For this mounting, the roller head 10 has, in the manner illustrated, outer bearing housings 18,18' fastened to the stator 12, and inner bearing housings 20,20' fastened to the rotor 14, between which the ball-bearings 16,16' are arranged. The outer and inner bearing housings 18,18' or 20,20' are composed of non-rusting antimagnetic steel and consequently have low eddy current losses. In all the exemplified embodiments illustrated, the outer rings of ball-bearings are each electrically separated from the outer bearing housing 18,18' by insulation 22,22'. Instead of or in addition to this, the inner rings of ball-bearings can also be separated from the inner bearing housing 20,20' by insulation (not illustrated).

The stator 12 is clamped so that it conducts well electrically, to the free end of a likewise unillustrated welding arm of the resistance seam welding machine. The welding arm and the stator 12, when the resistance seam welding machine is in operation, conduct the welding current and for this reason (just as the rotor 14) are composed of material which conducts electricity well, preferably copper. This welding current has to be transmitted by the stator 12 to the rotor 14, which transmits it to the welding point, preferably via an unillustrated electrode wire. For current transmission between stator and rotor there is provided a sliding contact current transmission device, which is indicated generally by the reference 24 and in the exemplified embodiment illustrated in FIG. 1 has two circular ring-shaped discs 26,26' which extend radially between rotor and stator at a mutual axial spacing and are flexibly designed in their intermediate parts 28,28' between the inner and outer circumferences.

The two flexible sliding contact discs 26,26' are each composed of a copper mesh, on which a contact ring 30,30' on the stay part 28,28' is axially fastened (e.g. welded) to the outer periphery of the disc in each case, and an axial sliding contact ring 32,32' on the intermediate part is axially fastened (e.g. electron beam-welded to the inner periphery of the disc in each case. The rotor 14 has on its inner circumference a flange 34, on which the discs 26,26' are fastened by means of unillustrated screws or merely by pressing, so that they conduct electricity well. Each axial sliding contact ring 32,32' is in sliding contact with an associated annular contact surface 36,36' of the stator 12. Each half of the stator 12 is provided with an annular collar 38 or 38', on which the annular contact surfaces 36 or 36' are formed. Between the discs is provided a spring device in the form of a stack of plate springs 40 for pressing the discs 26,26' against the stator 12. The plate springs create the necessary contact pressure between the axial sliding contact rings 32,32' and the annular contact surfaces 36,36' of the stator 12 which are associated with the rings.

The inner space between the stator 12 and the rotor 14 is sealed by means of O-shaped rings and shaft seals in the manner illustrated in FIG. 1. As the rotor 14 and the sliding contact surfaces have to be intensely cooled, ducts 52,52' and 53,53' are provided in the stator 12, ducts 54 in the rotor 14, and ducts 55' in the flexible sliding contact discs (ducts corresponding to the ducts 55', which are provided in the disc 26, are not visible in FIG. 1) for conducting a coolant through the roller head 10. Coolant is introduced into the duct 52 when the resistance seam welding machine is in operation and flows through the duct 53, through the non-visible ducts of the disc 26, through the ducts 54,55' and finally back through the ducts 53',52'.

A stable emulsion, and one which is above all suitable for foodstuffs, is used as a coolant for cooling and simultaneous lubrication, this being composed of 82% water, 15% rapeseed oil and 3% emulsifier. The emulsifier ML-55-F of Hefti AG, Zurich, has proved to be particularly suitable. More precise details about this emulsifier can be found in the Technical Data Sheet No. 3.201-d of Hefti AG.

In order to manufacture the emulsion, the emulsifier, which can be in the form of a concentrate, is added to water. Thereafter, vigorous agitation with a stirring bar takes place, until the emulsifier has completely dissolved in the water. The rapeseed oil is now carefully mixed with this. Finally, the emulsion must be mixed vigorously in a mixer and for a long time (at least 8 minutes), in order to obtain good stability in the emulsion. In order to prolong the stability, the emulsion can, if necessary, have a stabilizer mixed with it (as in the case of coolants and lubricants of machine tools).

The temperature of the coolant when it enters the roller head must reach 20° to 25° C., whereby the formation of condensation water is completely prevented.

The aforedescribed sliding contact current-transmission device 24 between rotor and stator of the roller head makes radial and axial relative movements possible between them without the contact pressure being disadvantageously influenced thereby. The copper mesh of the discs 26,26' ensures this relative mobility. The plate spring assembly 40, on whose spring force this relative mobility has no influence, keeps the contact pressure constant.

Possible alternatives to the sliding contact current-transmission device 24 illustrated in FIG. 1 are now described hereafter with reference to FIGS. 2 to 7.

Figure 2:
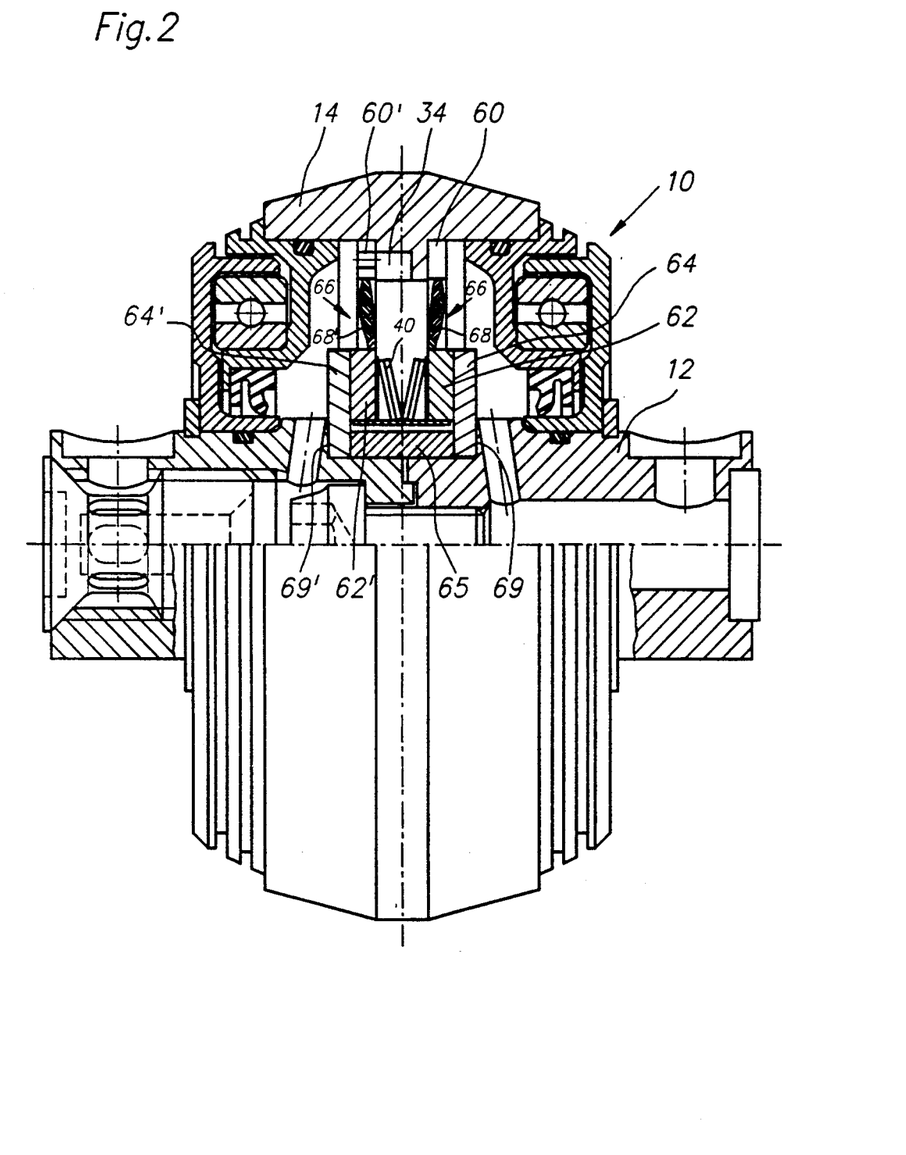
FIG. 2 shows a second specific embodiment of the roller head according to the invention.

FIG. 2 shows a second specific embodiment of the roller head 10, in which each disc 66,66' on the inner and outer circumference is provided with a contact ring 62,62' or 60,60', which is placed radially against the intermediate part 68,68'. The inner contact rings 62,62' once again form axial sliding contact rings which, however, in contrast to those in FIG. 1, are not composed of nickel silver or silver/graphite, but of copper, and are welded or soldered to the flexible copper mesh which forms the intermediate part 68,68' of the discs 66,66'. The associated annular contact surfaces 36,36', which in the exemplified embodiment in FIG. 1 are formed on the annular (ring) collars 38,38', are formed on intermediate rings 64,64' of nickel silver or silver/graphite or silver-plated/gold-plated copper, which are connected to the stator 12. The intermediate rings 64,64' are clamped to the stator 12 as inexpensive wear parts. To this end, there is arranged between them a clamping ring 65, which, when the stator 12 is assembled, presses the intermediate rings 64,64' against two annular shoulders 69,69' of the stator. In the exemplified embodiment according to FIG. 2 also, the contact rings 60,60' and the flange 34 are provided with ducts (not illustrated) for conveying the coolant through. In other respects, the construction of the roller head according to FIG. 2 corresponds to that according to FIG. 1 and for this reason does not need to be further described.

The advantage of the embodiment according to FIG. 2 as compared with that according to FIG. 1 can be seen in the fact that copper contact rings can be better welded or soldered to the copper mesh, and that intermediate rings of nickel silver or silver/graphite or silver-plated/gold-plated copper which do not have to be soldered or welded can be used, which, moreover, can be used on both sides. On the boundary surface between the intermediate rings 64,64' and the stator 12 contact transition points do in fact exist, but they are stationary contact transition points, that is to say, they are not sliding contact transition points, so that they do not cause noticeable additional losses.

Figure 3:
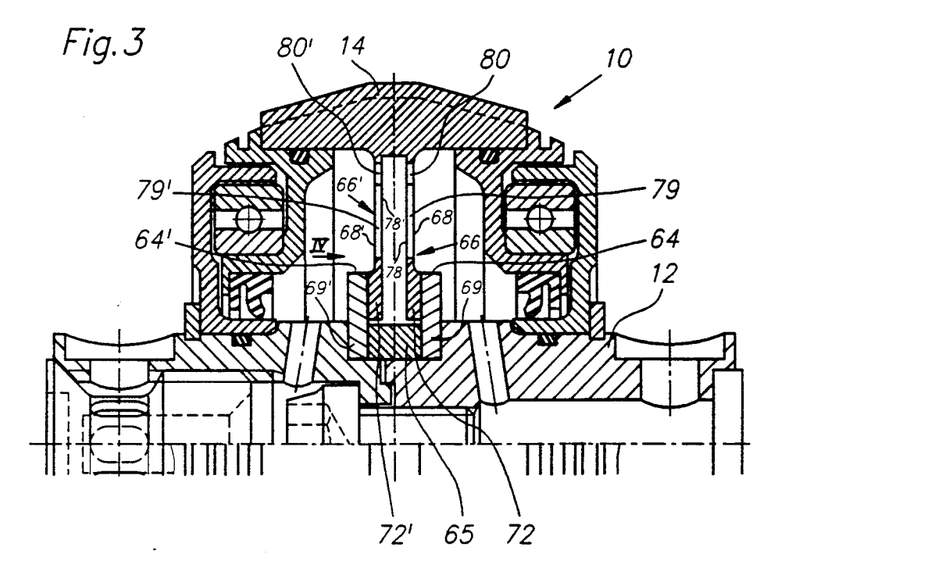
FIG. 3 shows a third specific embodiment of the roller head according to the invention.
Figure 4:
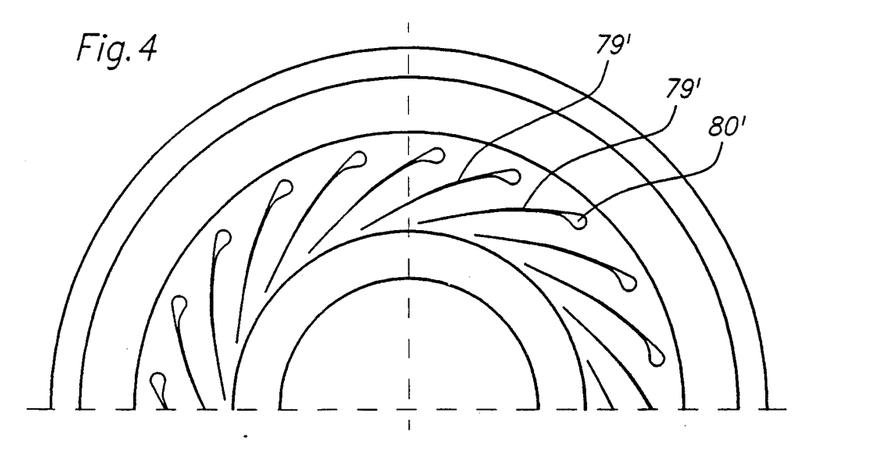
FIG. 4 shows as a detail a view in the direction of an arrow IV in FIG. 3.

FIG. 3 shows a third specific embodiment of the roller head 10, in which the copper mesh of the stay parts 68,68' in the specific embodiment according to FIG. 2 has been replaced by thin-walled metallic diaphragms 78,78' of the type illustrated in FIG. 4 or FIG. 7. The arrangement of the intermediate rings 64,64' and of the clamping ring 65 associated therewith corresponds to that shown in FIG. 2 and for this reason does not need to be described again.

In the specific embodiment according to FIG. 3, the rotor 14 is once again constructed as one part. The diaphragms 78,78' are formed on the rotor 14, that is to say, manufactured as one part therewith. The axial sliding contact rings 72,72' are formed on the diaphragms 78,78'. This design with contact rings moulded on merely serves to explain one exemplified embodiment, for it is readily possible to manufacture the diaphragm 78,78' as separate parts and to solder or weld them to the axial contact rings 72,72' and also to the rotor 14. In the exemplified embodiment illustrated, rotor, diaphragms and axial sliding contact rings have been machined from the solid.

In order to ensure the relative mobility between the rotor 14 and the stator 12 in axial direction, the diaphragms 78,78' are provided with slits 79,79'. These slits have been cut hair-fine into the diaphragms with a laser or by other suitable means. The diaphragms 78,78' are additionally provided with holes 80,80' for conveying the coolant through.

In the exemplified embodiment according to FIG. 3, the diaphragms 78,78' (just as the rotor 14 and the axial sliding contact rings 72,72') are composed of a flexible material and can therefore be used as a spring at the same time. The stack of plate springs 40 therefore becomes superfluous. In order to create the spring pressure force of the discs, the spacings between the contact surfaces of the axial sliding contact rings 72,72' and the clearance width between the intermediate rings 64,64' are so selected that in the inserted position, each diaphragm is prestressed as a spring, and thus creates the necessary contact pressure itself. Through the position of the slits 79,79' in the diaphragms 78,78', the spring constants and the thickness of the diaphragms can be matched to a great extent. A copper-cobalt-beryllium alloy can be considered as the material for their manufacture. If required, the spring properties can be improved by increasing the beryllium content of the alloy, but with this may be associated a deterioration of the electrical conductivity.

The throughflow of the coolant can be controlled by suitable design of the slits, and more especially, the holes 80,80'.

A special advantage of the specific embodiment according to FIG. 3 consists of the fact that the rotor 14 with moulded-on diaphragms 78,78' and axial sliding contact rings 72,72' can easily be replaced as a wear part. The intermediate rings 64,64', when worn, then merely have to be turned around. This specific embodiment is distinguished by a minimum number of components and by a clear division of wear parts and parts which can be re-used.

Figure 5:
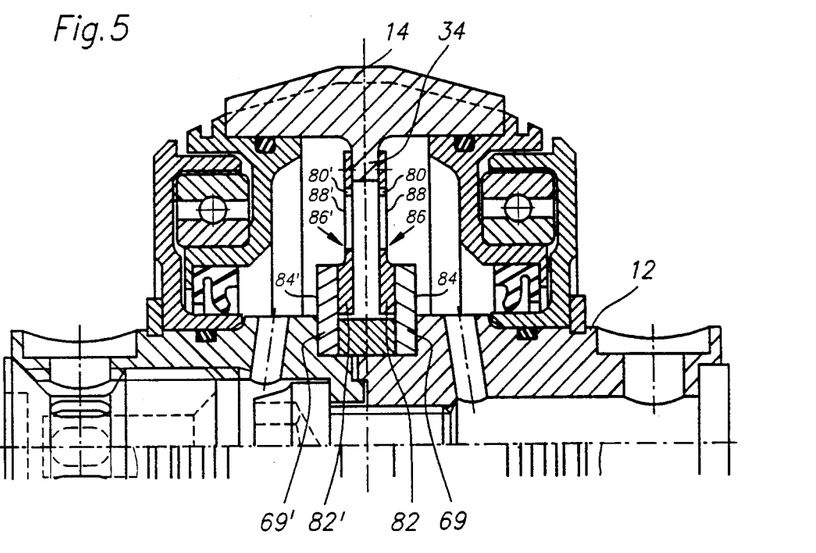
FIG. 5 shows a diagrammatic partial view in order to illustrate a fourth specific embodiment of the roller head according to the invention.
Figure 6:
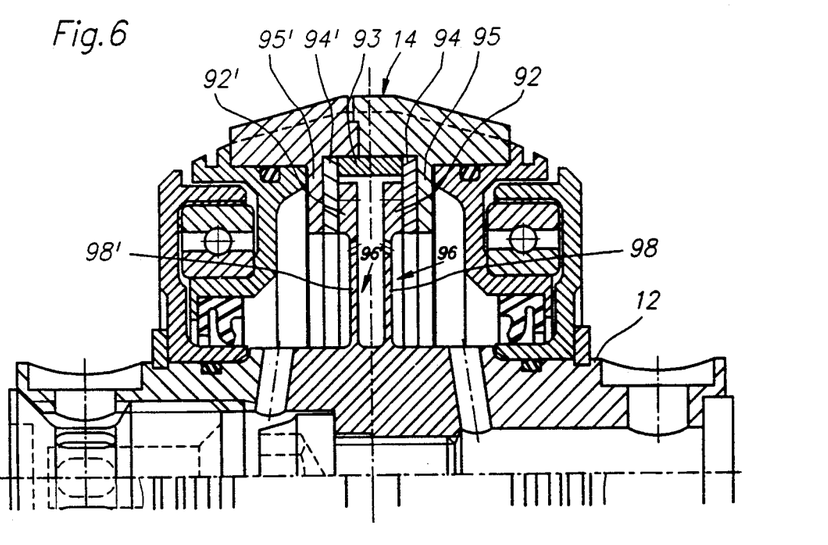
FIG. 6 shows a diagrammatic partial view in order to illustrate a fifth specific embodiment of the roller head according to the invention.

FIGS. 5 and 6 show variants of the specific embodiment according to FIG. 3. In the specific embodiment of the roller head according to FIG. 5, the discs 86,86' are designed in the form of diaphragms 88,88' with axial sliding contact rings 82,82' as separate parts and fastened to the flange 34 of the rotor 14, for example, by means of screws (schematically illustrated). The axial sliding contact rings 82,82' butt against intermediate rings 84,84'. In other respects, this specific embodiment corresponds to that according to FIGS. 3 and 4, and for this reason does not need to be further described.

In the specific embodiment of the roller head according to FIG. 6, the stator 12 is designed as one part and the rotor 14 as two parts, and therefore the reverse of FIG. 3. Also, in contrast to FIG. 3, the discs 96,96' with their diaphragms 98,98' are formed not on the rotor 14, but on the stator 12, and the intermediate rings 94,94' and their clamping ring 93 are provided on the rotor 14 instead of on the stator 12, as illustrated in FIG. 6. The axial sliding contact rings 92,92' formed on the diaphragms 98,98' butt against the intermediate rings 94,94', which for their part, are supported against ring collars 95,95' of the rotor 14. Otherwise, the specific embodiment according to FIG. 6 corresponds to that according to FIGS. 3 and 4, and therefore likewise does not need to be described in greater detail. The friction occurring in the embodiment according to FIG. 6 would appear to be somewhat greater than in that according to FIGS. 3 and 4.

As a result of the provision of the slots 79,79' in the diaphragms 78,78' according to FIG. 4, spokes are formed between the slots, and the diaphragms are thus converted into so-called spoked diaphragms. FIG. 7 shows various alternative specific embodiments of such spoked diaphragms.

Figure 7A:
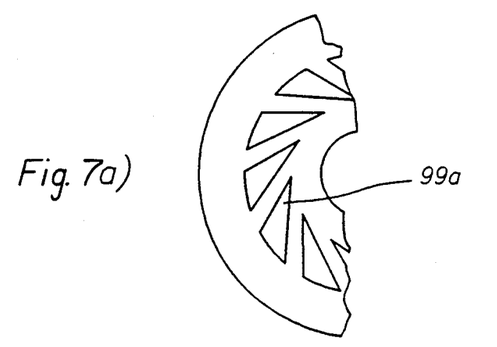
FIGS. 7a-7g show various designs of spoked diaphragms which can be used in the roller head according to the invention.
Figure 7B:
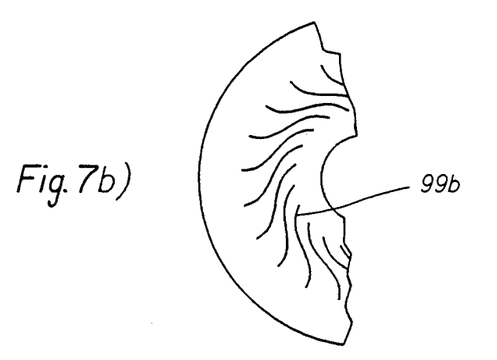

FIG. 7a and 7b show two types of slit-like slots 99a or 99b in the diaphragms. FIGS. 7c-7g show various cross-sectional views of spoked diaphragms of the type illustrated in FIGS. 7a and 7b. The slit-like slots 99a,99b can be cut by means of a laser. According to FIG. 7e, the axial sliding contact ring E provided on the inner circumference can be a moulded-on part of the diaphragm. According to FIGS. 7c and 7d, the axial sliding contact ring C or D is in each case a ring which is mounted on the diaphragm and is joined thereto. According to FIGS. 7f and 7g, such an axial sliding contact ring F or G can be soldered to the inner circumference of the diaphragm or connected to the same by sintering.

Figure 7C:
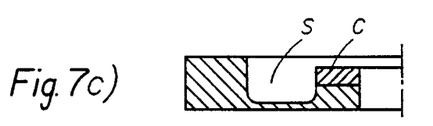
Figure 7D:
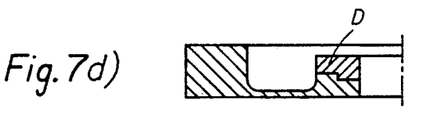
Figure 7E:
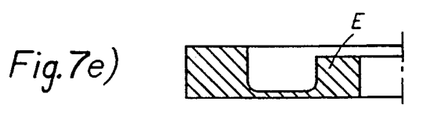
Figure 7F:
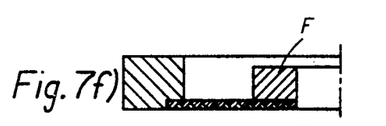
Figure 7G:
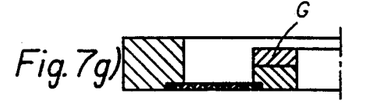

The variants of design according to FIG. 7 moreover show that the spokes can be designed in the manner of shovel-blade vanes S for conveying the coolant, as is indicated more especially in FIGS. 7c-7e.

With reference to the drawings, only specific embodiments in which the sliding contact current transmission device 24 has two discs have actually been described heretofore, but specific embodiments with one disc in each case are also possible. It is merely a question of the available space and the available transmission cross-sections. In the specific embodiment according to FIG. 1, a type of plate spring or a stack of springs could be fastened to the flange 34 instead of the second disc, in this case, which ensures the necessary contact pressure of the disc against the contact surface 36 or 36'. The same would apply to the specific embodiment according to FIG. 2. In the specific embodiments according to FIGS. 3-7, the creation of the spring force would require no additional spring device, because in these specific embodiments each disc is itself designed as a spring in any case.

If, in the case of the specific embodiments according to FIGS. 3 to 7, the diaphragms themselves are not designed as springs, a stack of plate springs such as the stack of springs 40 shown in FIGS. 1 and 2, can be provided to produce the spring force which is necessary for the contact pressure.

We claim:

1. Roller head for a resistance seam welding machine, having a stator assembly, an electrode roller which is rotatably mounted as a rotor assembly on the stator assembly, a sliding contact current transmission device which is arranged between the stator and rotor assemblies and is pressed by spring force against at least one of the assemblies and fluid ducts for passage of a coolant in the stator assembly, rotor assembly and sliding contact current transmission device, characterized in that the sliding contact current transmission device comprises at least one circular disc, which extends radially between the rotor and stator assemblies, has a radially inner and a radially outer circumference and is flexibly designed in its intermediate part between the inner and outer circumferences.

2. Roller head as claimed in claim 1, characterized in that the intermediate part is composed of a copper mesh.

3. Roller head as claimed in claim 1, characterized in that the intermediate part is composed of a thin-walled metallic diaphragm.

4. Roller head as claimed in claim 1, characterized in that the intermediate part is provided with spokes.

5. Roller head as claimed in claim 4, characterized in that the spokes are formed by slit-like slots in the intermediate part.

6. Roller head as claimed in claim 5, characterized in that the spokes are designed as vanes for conveying the coolant.

7. Roller head as claimed in claim 3, characterized in that the disc is formed on one of the stator and rotor assemblies.

8. Roller head as claimed in claim 1, characterized in that the sliding contact current transmission device comprises two of the circular discs, and the circular discs are axially spaced from each other.

9. Roller head as claimed in claim 1, characterized in that the disc is provided at least on one of the inner and outer circumferences with a contact ring and is fastened at the other of the inner and outer circumferences to one of the assemblies.

10. Roller head as claimed in claim 9, characterized in that the disc is provided on the inner and outer circumferences with a contact ring which is axially fastened to the intermediate part.

11. Roller head as claimed in claim 9, characterized in that the disc is provided on the inner and outer circumferences with a contact ring which is set radially against the intermediate part.

12. Roller head as claimed in claim 9, characterized in that for the disc at least one contact ring is in axial sliding contact with an annular contact surface of one of the 13. Roller head as claimed in claim 12, characterized in that the contact ring is constructed from a material selected from the group consisting of nickel silver, silver/graphite and silver-plated/gold-plated copper and each associated annular contact surface is constructed from a material selected from the group consisting of copper and gold-plated copper.

14. Roller head as claimed in claim 12, characterized in that the contact ring is composed of copper and each associated annular contact surface is formed on an intermediate ring and constructed from a material selected from the group consisting of nickel silver, silver/graphite and silver-plated/gold-plated copper, which is connected to one of the stator and rotor assemblies.

15. Roller head as claimed in claim 12, characterized in that a spring device is arranged on that side of the contact ring which faces away from the associated annular contact surface, in order to produce a spring force applying contact pressure to the disc.

16. Roller head as claimed in claim 15, characterized in that the spring device is comprised of a stack of plate springs.

17. Roller head as claimed in claim 1, characterized in that the coolant is an emulsion containing oil, which serves as a lubricant at the same time.

18. Roller head as claimed in claim 17, characterized in that the emulsion is composed of 82% water, 15% rapeseed and 3% emulsifier.

19. Roller head for a resistance seam welding machine, having a stator assembly, an electrode roller which is rotatably mounted as a rotor assembly on the stator assembly, a sliding contact current transmission device which is arranged between the stator and rotor assemblies and is pressed by spring force against at least one of the assemblies and fluid ducts for passage of a coolant in the stator assembly, rotor assembly and sliding contact current transmission device, characterized in that the sliding contact current transmission device comprises at least one circular disc, which extends radially between the rotor and stator assemblies, has a radially inner and a radially outer circumference and is flexibly designed in its intermediate part between the inner and outer circumferences, the disc is provided on at least one of the inner and outer circumferences with a contact ring and is fastened at the other of the inner and outer circumstances to one of the stator and rotor assemblies, the contact ring is in axial sliding contact with an annular contact surface of the other of the rotor and stator assemblies; and the intermediate part of the disc is constructed from a flexible material and serves as a pre-stressed spring in order to produce a spring force and apply contact pressure to the disc.

20. Roller head as claimed in claim 19, characterized in that the current transmission device comprises two circular discs between the stator and rotor assemblies; the stator assembly is designed as a bipartite axle which is provided with two annular shoulders on whose surfaces facing each other are arranged intermediate rings constructed from a material selected from the group consisting of nickel silver and silver/graphite which are in contact with the contact rings of the two discs which are connected to the rotor assembly.

21. Roller head as claimed in claim 19, characterized in that the current transmission device comprises two circular discs between the stator and rotor assemblies; the rotor assembly is designed to be bipartite, and is provided with annular collars on whose surfaces facing each other are arranged intermediate rings constructed from a material selected from the group consisting of nickel silver and silver/graphite which are in contact with the contact rings of the two discs which are connected to the stator assembly.

22. Roller head for a resistance seam welding machine, having a stator assembly, an electrode roller which is rotatably mounted as a rotor assembly on the stator assembly, a sliding contact current transmission device which is arranged between the stator and rotor assemblies and is pressed by spring force against at least one of the assemblies and fluid ducts for passage of a coolant in the stator assembly, rotor assembly and sliding contact current transmission device, characterized in that the sliding contact current transmission device comprises two circular discs, which extend radially between the rotor and stator assemblies, each disc has a radially inner and a radially outer circumference and is flexibly designed in its intermediate part between the inner and outer circumferences, each disc is also provided on at least one of the inner and outer circumferences with a contact ring and is fastened at the other of the inner and outer circumstances to one of the stator and rotor assemblies, each contact ring is in axial sliding contact with an annular contact surface of the other of the stator and rotor assemblies, a spring device is arranged on that side of each contact ring which faces away from the annular contact surface in order to produce a spring force applying contact pressure to the disc, the spring device includes a stack of spring plates, and the stator assembly is designed as a bipartite axle with two annular collars having surfaces facing each other as well as the two contact rings on the discs, and the rotor is a single part having an inner circumference with a flange to which the two discs are fastened.

23. Roller head as claimed in claim 22, characterized in that the surfaces of the two annular collars which face each other form the annular contact surfaces of the stator assembly.

* * * * *